United States Patent
Viswanath et al.

(10) Patent No.: US 7,337,132 B2
(45) Date of Patent: Feb. 26, 2008

(54) CUSTOMIZABLE TWO STEP MAPPING OF EXTENSIBLE MARKUP LANGUAGE DATA IN AN E-PROCUREMENT SYSTEM AND METHOD

(75) Inventors: Sridatta Viswanath, Santa Clara, CA (US); Yafeng Li, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 12 days.

(21) Appl. No.: 09/982,210

(22) Filed: Oct. 17, 2001

(65) Prior Publication Data
US 2003/0074271 A1 Apr. 17, 2003

(51) Int. Cl.
*G06Q 30/00* (2006.01)
*G06F 17/30* (2006.01)
(52) U.S. Cl. .............. 705/26; 705/27; 705/1
(58) Field of Classification Search ......... 705/26–28, 705/37, 78, 1; 709/206, 203; 395/575, 500
See application file for complete search history.

(56) References Cited

U.S. PATENT DOCUMENTS

| | | | |
|---|---|---|---|
| 4,951,196 A * | 8/1990 | Jackson ..................... | 705/37 |
| 5,361,199 A | 11/1994 | Shoquist et al. | |
| 5,557,780 A * | 9/1996 | Edwards et al. ............. | 703/27 |
| 5,694,551 A | 12/1997 | Doyle et al. | |
| 5,708,828 A | 1/1998 | Coleman | |
| 5,758,327 A | 5/1998 | Gardner et al. | |
| 6,023,683 A | 2/2000 | Johnson et al. | |
| 6,044,362 A | 3/2000 | Neely | |
| 6,064,977 A * | 5/2000 | Haverstock et al. ......... | 705/9 |
| 6,065,120 A * | 5/2000 | Laursen et al. .............. | 726/5 |
| 6,125,391 A * | 9/2000 | Meltzer et al. ............ | 709/223 |
| 6,144,990 A * | 11/2000 | Brandt et al. ............. | 709/203 |
| 6,351,745 B1 | 2/2002 | Itakura et al. | |
| 6,609,108 B1 * | 8/2003 | Pulliam et al. .............. | 705/27 |
| 6,658,483 B1 * | 12/2003 | Iwamoto et al. ........... | 709/246 |
| 6,772,413 B2 | 8/2004 | Kuznetsov | |

(Continued)

OTHER PUBLICATIONS

"Netscape Announces Availability of Netscape BuyerXpert 2.0 for corporate Procurement". Pheonix, Artizona. Nov. 17, 1998 [extracted from www.Archive.org on Jul. 19, 2006].*

(Continued)

*Primary Examiner*—Jeffrey A. Smith
*Assistant Examiner*—William J. Allen
(74) *Attorney, Agent, or Firm*—Robert C. Kowert; Meyertons, Hood, Kivlin, Kowert & Goetzel, P.C.

(57) ABSTRACT

In an electronic purchasing and procurement system having an Extensible Markup Language (XML) content transformation method and system. The XML content transformation system includes logic for identifying XML content from an external database and presenting XML content formatted in response to purchase requests from the users of the electronic purchasing and procurement system. In one embodiment of the present invention, the XML content transformation system receives an in-bound document containing XML content of a first XML data format. The XML content transformation system then maps the XML content of the first XML data format to an internal proprietary second XML data format using the tag information contained in the first XML data format. The second XML data format is subsequently transformed in a third XML data format suitable for delivery to the user in an out-bound documents.

24 Claims, 8 Drawing Sheets

U.S. PATENT DOCUMENTS

| | | | |
|---|---|---|---|
| 6,876,977 | B1 | 4/2005 | Marks |
| 6,882,983 | B2 | 4/2005 | Furphy et al. |
| 6,910,018 | B1 | 6/2005 | Okada et al. |
| 6,931,420 | B1 | 8/2005 | Silvester et al. |
| 2001/0037254 | A1* | 11/2001 | Glikman .................. 705/26 |
| 2001/0047311 | A1* | 11/2001 | Singh ...................... 705/26 |
| 2002/0023045 | A1* | 2/2002 | Feilbogen et al. ........ 705/37 |
| 2002/0035606 | A1* | 3/2002 | Kenton .................. 709/206 |
| 2002/0042779 | A1 | 4/2002 | Osaka et al. |
| 2002/0062240 | A1 | 5/2002 | Morinville |
| 2002/0065693 | A1* | 5/2002 | Hattori et al. ............. 705/7 |
| 2002/0069157 | A1* | 6/2002 | Jordan ...................... 705/37 |
| 2002/0087419 | A1 | 7/2002 | Andersson et al. ....... 705/28 |
| 2002/0091533 | A1* | 7/2002 | Ims et al. ................... 705/1 |
| 2002/0107699 | A1* | 8/2002 | Rivera et al. .............. 705/1 |
| 2002/0116205 | A1* | 8/2002 | Ankireddipally et al. .. 705/1 |
| 2002/0133569 | A1* | 9/2002 | Huang et al. ........... 709/219 |
| 2002/0156685 | A1 | 10/2002 | Ehrlich et al. |
| 2002/0156687 | A1* | 10/2002 | Carr et al. ................ 705/26 |
| 2002/0174000 | A1* | 11/2002 | Katz et al. ................. 705/7 |
| 2002/0184070 | A1* | 12/2002 | Chen et al. ................ 705/9 |
| 2002/0184076 | A1 | 12/2002 | Susnjara |
| 2002/0184123 | A1 | 12/2002 | Sijacic et al. |
| 2002/0184145 | A1* | 12/2002 | Sijacic et al. ............ 705/40 |
| 2002/0188524 | A1* | 12/2002 | Shimizu ................... 705/26 |
| 2003/0002526 | A1 | 1/2003 | Dias et al. ............... 370/46 |
| 2003/0061121 | A1* | 3/2003 | Ouchi ...................... 705/27 |
| 2003/0074269 | A1 | 4/2003 | Viswanath |
| 2003/0110114 | A1 | 6/2003 | Dmochowski et al. |
| 2003/0139975 | A1* | 7/2003 | Perkowski ............... 705/26 |

OTHER PUBLICATIONS

"More options for electronic billing". Patel, Jeetu. Information Week. Manhasset: Nov. 29, 1999. Iss 763, p. 61. [extracted from Proquest database Jul. 19, 2006].*

"iPlanet Outlines Aggressive Services to Propel Customers From Strategy to Cot Come in 100 Days". Time Warner—Newsroom. Mar. 8, 2000 [recovered from www.timewarner.com/corp/newsroom via Google on Jan. 10, 2007].*

"Western Australia's Gem of an eProcurement System Expected to Result in $100 million Annual Savings". Time Warner—Newsroom. Oct. 16, 2000 [recovered from www.timewarner.com/corp/newsroom on Jan. 10, 2007].*

"New iPlanet Market Maker Platform Allows Rapid Deployment of Next Generation Open Digital Marketplaces". Time Warner—Newsroom. Mar. 16, 2000 [recovered from www.timewarner.com/corp/newsroom on Jan. 10, 2007].*

"Sun-Netscape alliance pollishes e-commerce package". Wong, Wylie. CNET News.com. Sep. 12, 1999.*

U.S. Appl. No. 09/982,214.

U.S. Appl. No. 10/099,697.

\* cited by examiner

CUSTOMIZABLE TWO STEP MAPPING OF EXTENSIBLE MARKUP LANGUAGE DATA IN AN E-PROCUREMENT SYSTEM AND METHOD

CROSS REFERENCE TO RELATED APPLICATION

This is related to Viswanath et al., co-filed U.S. patent application Ser. No.: 09/982,214 titled "DOCUMENT EXCHANGE FRAMEWORK FOR AUTOMATED EXTENSIBLE MARKUP LANGUAGE PROCESSING IN AN E-PROCUREMENT System and Method". To the extent not repeated herein, the contents of this patent application are incorporated herein by reference.

FIELD OF THE INVENTION

The present claimed invention relates generally to the field of wireless communication systems. More particularly, the present claimed invention relates to Extensible Markup Language (XML) content retrieval and transformation in an electronic purchasing and procurement environment.

BACKGROUND ART

The Internet has become the dominant vehicle for data communications with a vast collection of computing resources, interconnected as a network from sites around the world. And with the growth of Internet usage has come a corresponding growth in the usage of Internet devices, wireless devices and services in a way different from the traditional uses of such devices.

The growing base of Internet Users has become accustomed to readily accessing Internet-based services, which traditionally were restricted or limited to the "client/server" environment, at any time from any location. Accessibility to traditional business services and products over the Internet means enterprises have to adjust to new paradigms of transacting business.

Consequently, some organizations are, for example, scrambling to implement e-commerce and customer relationship management (CRM) strategies to increase revenue and bring them closer to their customer base. But organizations that are committed to an e-business strategy realize that their procurement operations are an equally critical aspect of their business. By implementing a sound e-procurement solution, organizations can truly integrate with their supply chain partners and realize dramatic business efficiencies and cost saving in purchasing everything from office supplies to services to raw materials.

For any organization, procuring goods and services is a core business function that is critical to the successful operations of the company. All organizations must procure "indirect" goods such as office supplies and other materials that support business operations and enable maintenance and repair operations (MROs) to function.

In addition, many organizations must also procure "direct" goods, such as raw materials or components that are used in manufacturing processes. Other goods or services that organizations must procure include travel, consulting services and equipment.

Many large organizations have dedicated resources that handle procurement at a corporate level. By centralizing procurement, organizations can bring control over the entire process and improve their purchasing efficiencies. Unfortunately, in many organizations, procurement is still a fragmented, paper-intensive process that involves many forms, phone calls, and approval cycles. Just as procurement requires interfacing with multiple suppliers, it requires interacting with different areas of the organization (accounting, management, lines of business, receiving, etc.) each of which may have different processes and approval flows.

As organizations begin to embrace e-business technologies for selling goods and serving their customers online, they are also beginning to look at the efficiencies that e-commerce technologies can bring their internal procurement operations. Thus, e-procurement is quickly assuming a highly strategic role within the e-business strategies of many organizations.

With e-procurement, organizations can move the entire purchasing catalogs into a central catalog of products from approved suppliers, helping buyers quickly locate goods and services. E-procurement helps automate the formerly time consuming review process typically required to approve requisitions and initiate purchases. Finally e-procurement helps the organization realize efficiencies by accelerating the purchasing process, identifying existing inventory to minimize redundant purchasing, detecting unauthorized spending, determining purchasing patterns for improved budgeting, and ensuring contract compliance.

As the number of business applications on the Internet increases, having restricted content and very limited information about goods and services transactions over the Internet impairs the ability of purchasing professionals to take advantage of Internet technologies and provide efficient and cost effective services.

SUMMARY OF INVENTION

Accordingly, to take advantage of the myriad of e-commerce applications being developed, an e-purchasing and e-procurement system are needed with extensibility capabilities to allow content requests from purchasing requisitioners to the e-purchasing and e-procurement system to be formatted based on available Internet purchasing standards. Further, a need exists for a system and method of presentation formatting of content to be different from the formatting logic of the user's request to enable quick implementation of data gathered for presentation to the client. A need exists for "out-of-the-box" solutions to allow technically unsophisticated end-users to connect to the Internet and perform sophisticated purchasing and procurement decisions and activities not available in the prior art in an organization's purchasing environment without unduly tasking the end-user's technical abilities. A need further exists for an improved and less costly device independent system, which improves efficiency and provides content to various users of different configurations without losing the embedded features designed for these devices.

What is described is an e-procurement system having a portal server supporting a robust procurement system providing a wide range of features that purchasing and procurement applications require including storing capabilities for various purchasing and procurement functions in a business environment. In one embodiment of the present invention, the procurement system includes a catalog management system that integrates information from multiple external catalogs that include a collection of goods and services that may be ordered electronically from a database repository into a consolidated catalog of goods and services from approved suppliers to enable a purchasing or procurement agent to purchase items over the Internet.

In one embodiment of the present invention, the procurement processing system includes a requisition and order management module that helps organizations to streamline the requisitions process in the organization. The requisition and order management module allows users to request multiple items from different suppliers or a single requisition from a plurality of back-end resource servers on the Internet and transforms the content into a format suitable for delivery to the client. In one embodiment, an Extensible Markup Language (XML) content is formatted to transform the XML content from an external source into an appropriate markup content for delivery to a request from a user of the e-procurement system of the present invention.

The present invention further includes a Data Mapping Framework that allows multiple documents to be delivered at multiple locations based on a single requisition request by a user. The Data Mapping Framework allows the e-procurement system of the present invention to automatically process inbound and outbound XML document requests handled by the e-procurement system.

Embodiments of the present invention are also directed to a system and a method for accepting in-bound order requests in a first data format from users and transmitting out-bound orders in a second data format that is substantially different from the first data format. The document framework of the present invention is further utilized to accept communications from the system formatting and presentation in the electronic purchasing and procurement environment of a business enterprise. In general, embodiments of the present invention vary the degree of handling supplier or buyer requests to a plurality of purchase orders or requisitions from a plurality of order catalogs from web-sites based on a plurality of suppliers connecting to the electronic procurement environment. The present invention implements internal proprietary content request formatting to retrieve extensible markup language content form a data-source external to the e-procurement system or from a file-system on a server based on detailed user request information. In other words, the embodiments of the invention provide user specific content request formatting and presentation of content gathered from various back-end resources and presented in a consolidated form in the e-procurement environment.

Embodiments of the invention include an extensible markup language (XML) content generation and transformation solution designed to improve the handling of Open Buying on the Internet (OBI) Standard content requests from a variety of user requisition requests to the procurement and purchasing system of the present invention. The requested information may be gathered from a variety of supplier catalog over a variety of web-sites and integrated for presentation to a variety of different user requests. The present invention allows for the intelligent mapping of Internet based OBI standard language content requests to the purchasing and procurement system using one or more Internet access protocols available to the user to format the data gathered into a coherently and cohesively formatted content into one or more markup language documents suitable for delivery to the requesting user.

To achieve the content request delivery formatting and data presentation formatting of the present invention, embodiments provide a software-implemented process based on the XML data mapping format for use in an Internet purchasing based environment using a variety of markup languages to format data content to any number of documents without modifying the underlying code. Contents of the purchase requisition are then mapped into an internal proprietary XML data format to allow for the quick and effective processing of the purchase requests. The mapped XML data is then reformatted and delivered in an XML format suitable for delivery in response to the purchase request. In one embodiment of the present invention, an Extensible Markup Language (XML) may be used to format content requests from the user to the purchasing and procurement system. The purchasing and procurement system then may use a sub-processing XDOC framework to generate XML data fetched and parsed in response to the user's request.

Embodiments of the present invention generate internal tags which correspond to tag information contained in the OBI XML data presented to the e-procurement system of the invention. The internal tag is then used to access mapping information responsive to the OBI XML data from a database that stores data and objects that correspond to the OBI XML data. The internal tag further allows the data mapping framework to reference associated attribute information from the database with respect to each data object.

Embodiments of the present invention include an extensible configuration file that is text based and allows a user of the e-procurement system to dynamically change file characteristics of the contents of the purchase request.

Embodiments of the present invention further include mapping logic that maps the OBI XML content of a purchase order of a first format into an intermediary second data format for processing by the Data Mapping Framework. The second data format is subsequently transformed into a third data format suitable for delivery in response to the particular purchase order.

Embodiments of the present invention receive a user purchase requisition request from a particular user using an Internet based Open Buyer's Interface standard protocol. OBI is the standard used to connect multiple e-commerce sites together to provide real time data sharing between suppliers and purchasers. OBI allows multiple Internet sites to behave as one site.

Embodiments of the present invention generate out-bound documents in response to the in-bound requests from purchasers over the Internet. Out-bound documents are generated in XML which is a batched process data from one site to another. XML allows systems to be updated as data is passed back and forth from one system to another. The present invention allows the XML data to be configured to export and import data to the appropriate system on-demand, share real-time data between multiple sites and effectively keep site data in synchronization.

A sub-process is used for formatting the requested data for presentation to the requesting client. In this embodiment, the present invention associates the contents of a purchase order to an arbitrary XML data source in a database associated with the e-procurement system. The retrieved XML data is transformed using a proprietary data object and attributes transformation logic into an appropriate format such as a Hyper-Text Markup Language and a host of other markups languages.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The invention is directed to a system, an architecture, subsystem and method to manage an extensible markup language content request formatting and presentation processes in an e-commerce procurement and purchasing environment in a way superior to the prior art. In accordance with an aspect of the invention, an e-procurement and e-purchasing system provides users both content request formatting processes and presentation formatting processes that enable order requisitions to be electronically processed on-line on the Internet.

In the following detailed description of the present invention, a system and method for Internet protocol based communication system are described. Numerous specific details are not set forth in order to provide a thorough understanding of the present invention. However, it will be recognized by one skilled in the art that the present invention may be practiced without these specific details or with equivalents thereof.

Generally, an aspect of the invention encompasses providing an integrated e-procurement and e-purchasing system having a wide range of order requisition, process, acknowledgement and other services to online users who may connect to an enterprise system of on-line purchasing and requisitions. The invention can be more fully described with reference to FIGS. 1 through 8B.

Figure 1:
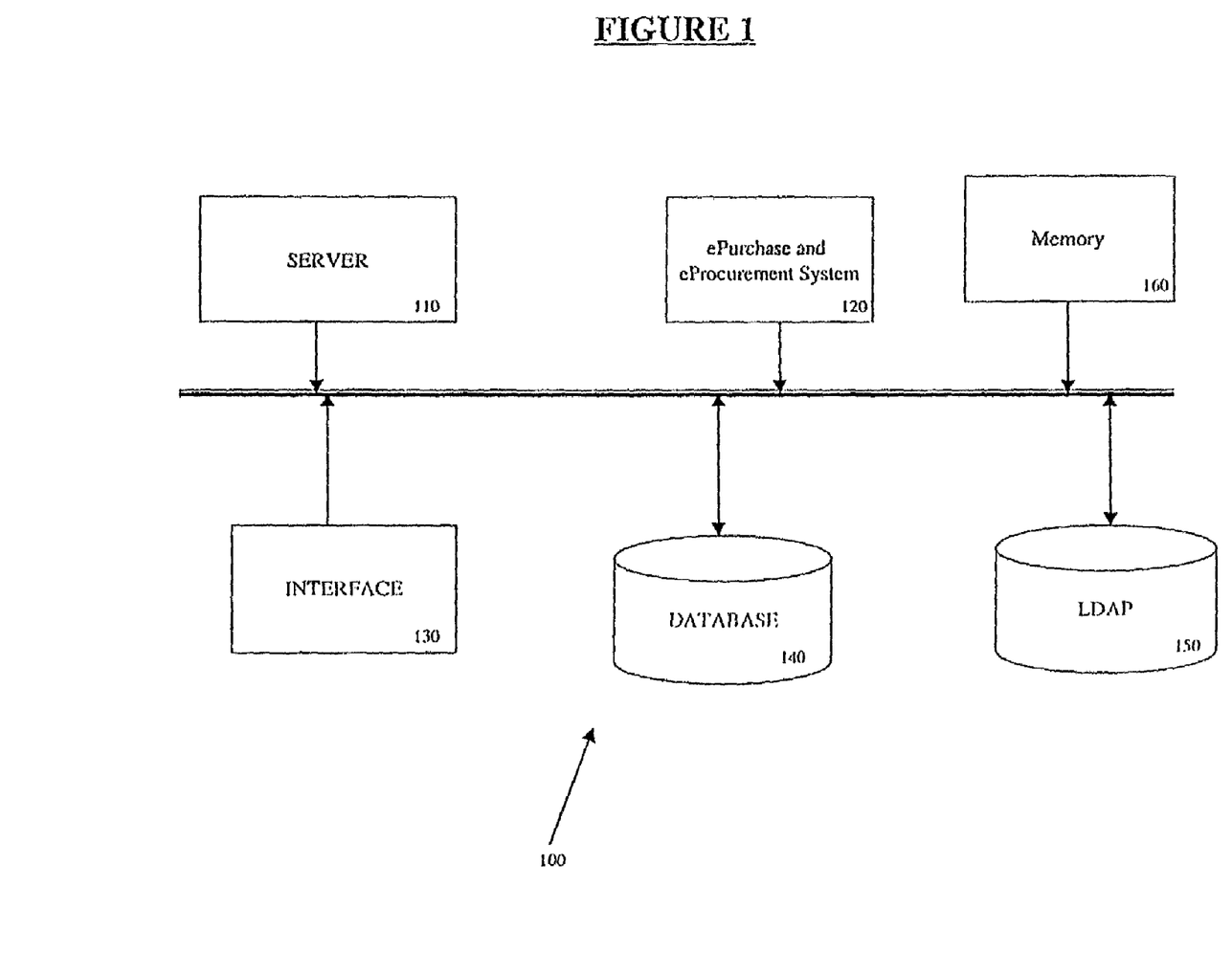
FIG. 1 is a block diagram of one embodiment of the e-commerce environment of the present invention.

FIG. 1 depicts an e-commerce procurement and purchasing environment of one embodiment of the present invention. The on-line purchasing and procurement environment 100 shown in FIG. 1 comprises computer server 110, e-Purchase and e-Procurement system 120, Interface 130, Database 140, Directory 150 and Memory 160.

Server 110 is coupled to provide an e-platform application server for the e-procurement and e-purchasing environment of the present invention. Server 110 provides a user with a single sign-on facility to the e-procurement system of the present invention, as well as the ability to customize the e-procurement system. Server 110 provides scalability and high availability to the user.

E-Procurement system 120 is coupled to Server 110 to provide an on-line centralized control for buying goods and services for enterprise operations. E-Procurement system 120 is a business-to-business application for purchasing and procurement professionals who are within an organization in the enterprise. E-Procurement system 120 is further extensible to allow non-professional purchasing and procurement persons with the enterprise to purchase consumables, such as office supplies, small office equipment and services from suppliers on the Internet.

Still referring to FIG. 1, Interface 130 couples to e-Procurement system 120 and provides a foundation for order submissions, and establishes communication between a customer and legacy systems and the e-Procurement system 120 of the present invention.

Interface 130 further supports secure transmission of data over public and private networks, as well as the storage of documents, tracking of services and the management of tasks. In one embodiment of the present invention, Interface 130 supports the American National Standards Institute (ANSI) ASCII 12 and other communication interface standards. Interface 130 further supports the use of graphical tools for mapping, translation and conversion of any file format such as Electronic Data Interface (EDI) to any other file format.

Database 140 is coupled to the e-Procurement system 120 to provide ordering and catalog information to the user. Database 140 may be an "off-the-shelf" software product such as those sold by Oracle corporation of Redwood City, Calif.

In the e-Procurement system 120 of the present invention, Database 140 also provides an intermediary storage facility of catalog information where orders are stored that originated by a user. In-bound orders are processed by e-Procurement system 120 using order information retrieved from the catalogs stored in Database 140. E-Procurement system 120 transmits out-bound order documents based on available catalog information from a supplier to the buyer.

Directory 150 of FIG. 1 is coupled to e-Procurement system 120 to store membership information of users of the e-Procurement system 120. Directory 150 also stores information on the suppliers, as well as location information of buyers and sellers in order to facilitate an effective and efficient communication of order and supply information between enterprises.

Memory 160 is coupled to the Server 110 to store transient copies of purchase requisitions stored in Database 140. A purchase order requisition of catalog information stored in Memory 160 has a one-to-one correlation with data objects stored in Database 140. Information stored in Memory 160 may be stored as Java objects, or the like, in a manner well known in the art.

Figure 2:
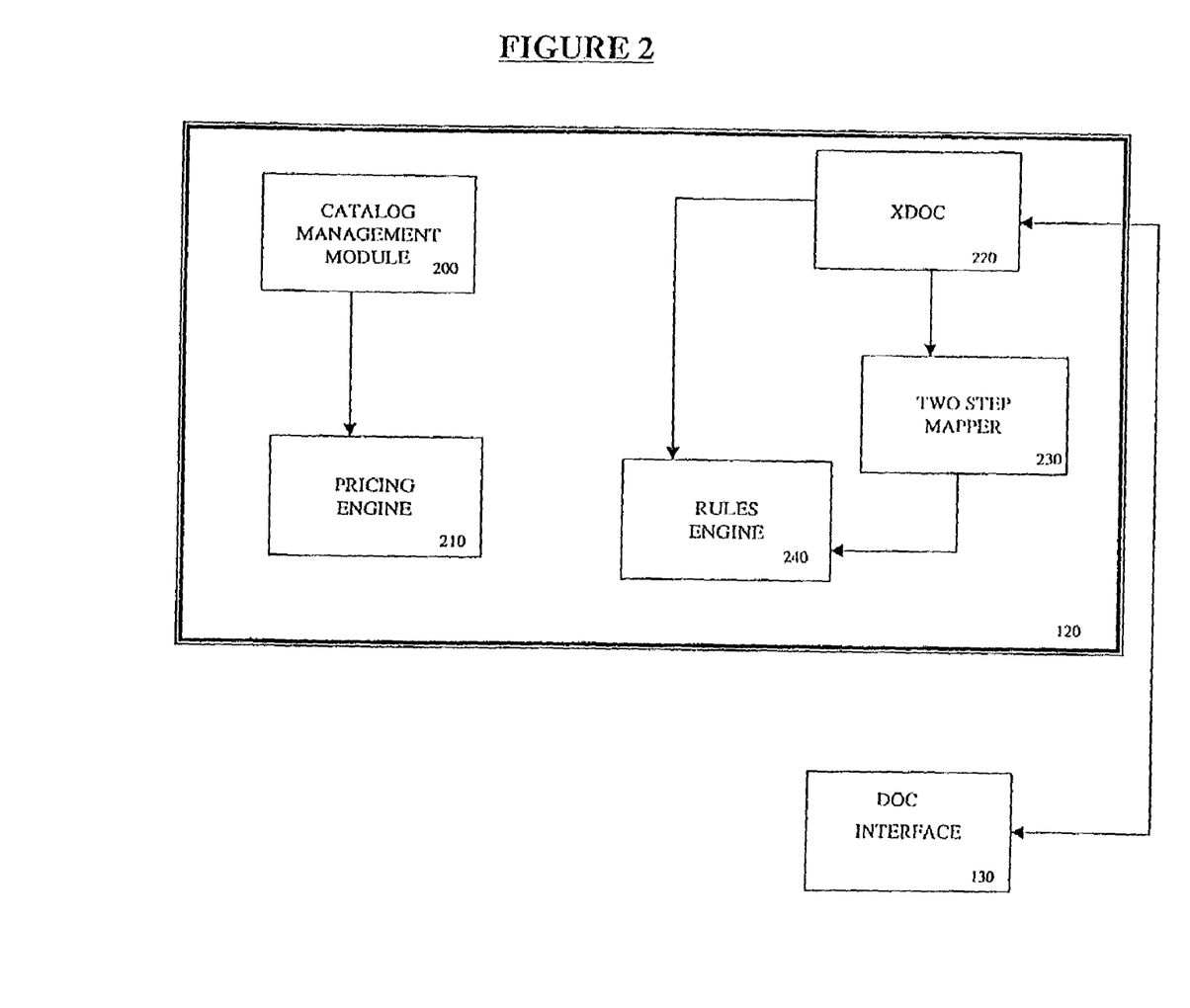
FIG. 2 is a block diagram of an embodiment of the architecture of the e-procuring and e-purchasing system of one embodiment of the present invention.

Referring now to FIG. 2, a block diagram of one embodiment of the e-Procurement system 120 of the present invention is shown. As shown in FIG. 2, e-Procurement system 120 comprises catalog managing module 200, catalog pricing engine 210, Document Exchange (XDOC) module 220, Mapping Module 230 and Rule engine module 240. Also shown in FIG. 2 is DOC Interface module 130 which is coupled to XDOC 220.

To make products available to buyers, suppliers organize product information into catalogs. The product information data structure in a catalog is a hierarchy of categories with items under these categories. The ways of representing this information vary from supplier to supplier, even among suppliers of similar products.

Catalog management module 200 allows suppliers to map their existing catalogs to the e-Procurement system 120 using a set of graphical interface tools. Catalog management module 200 allows for a quick real-time catalog creation and maintenance by providing creation of buyer managed content.

Catalog management module 200 further enables a system administrator of the e-Procurement system 120 to create and maintain a standardized structure that maps supplier catalog data to an e-procurement and purchasing environment. Catalog management module 200 also provides the system administrator with the environment to create and manage group-specific buyers and suppliers catalog and generate requisitions and purchase products.

Pricing module 210 is coupled to Catalog management module 200 to provide pricing rules for catalog items provided by various suppliers. Pricing module 210 is configurable to allow the control of the flow of pricing information for purchase requests between a purchaser and a supplier in the e-purchasing and e-procurement environment of the present invention.

XDOC 220 is coupled to Catalog management module 200 to automatically process in-bound order requests to the e-Procurement system 120 and the corresponding out-bound order data. E-Procurement system 120 generates XML documents for completing in-bound and out-bound transactions to suppliers etc. XDOC 220 examines the tags of any incoming document to the e-Procurement system 120 and determines whether a corresponding object to the tag is stored in Database 140.

If the incoming document tag has a corresponding database data object, XDOC 220 populates the incoming requests with the attributes that correspond to the identified object tag. For example, an incoming document may have a tag in the incoming XML file such as <billing address>. This tag is defined by the present invention as a data object as <bill to> in Database 140.

Upon identifying the <billing address> tag, XDOC 220 immediately associates the tag with the <bill to> data object in Database 140 and subsequently populates the attributes associated with the <bill to> object. In the present invention, XDOC 220 has the flexibility to write out XML files in different formats. The files can be in OBI or non-OBI formats depending on how the business rules are set up.

Still referring to FIG. 2, Mapping Module 230 is coupled to XDOC module 220 to provide a two step mapping process in accordance with an embodiment of the present invention to transform OBI compliant XML files and non-OBI compliant XML files into an internal XML compliant file suitable to the e-Procurement system 120. The two step mapping scheme enables the e-Procurement system 120 to handle the translation of the output or the input of any XML document of any XML standard or version without modification of the underlying file code.

Rules module or engine 240 is coupled to XDOC 220 to provide the underlying business rules that control the operating transaction principles of the e-Procurement system 120. In the present invention, Rules module 240 is configurable with generalized statements that allow system administrators to control the flow and behavior of e-procurement and purchasing system 120. The underlying business rules sematics may not be as complex as a full programming language that allows the user to perform typical customizations such as page layouts, icon layouts and other "click and surf" functions typical in Internet computing.

Figure 3:
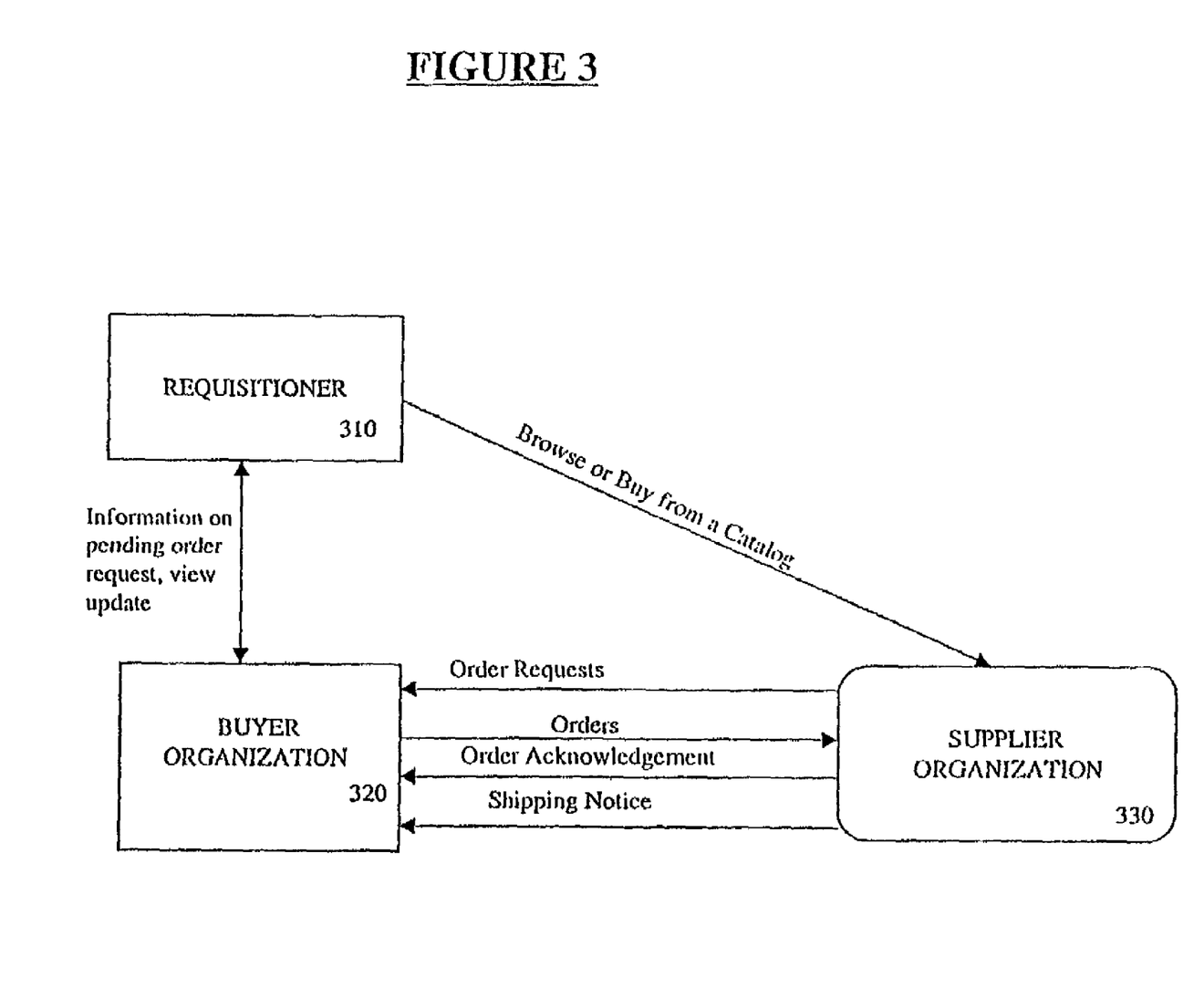
FIG. 3 is a block diagram of an exemplary process flow implementation of a purchase requisition of an embodiment of the present invention.

FIG. 3 is a block diagram depiction of an exemplary process flow of the Open Buying on the Internet (OBI) standard which is the underlying standard utilized in Interface 130. The process flow shown in FIG. 3 comprises the interaction of these entities: requisition 310, Buying 320 and Supplier 330.

Requisition 310 may be the user with a need for a product or service, who meets this need by querying the Supplier 330 catalogs for the required items. The Requisition 310 generates order requests and queries order status to the e-Procurement system 120 using an Internet browser.

Buyer 320 represents a purchasing management and information system which supports purchasing and procurement functions within an enterprise. These systems include an OBI server for receiving OBI order requests and retrieving OBI orders. The system further includes handling a requisition profile information, trading partner information and other information necessary to complete an order. The Buyer 320 also negotiates and maintains contractual relationship with the Supplier 330.

Supplier 330 maintains a dynamic electronic catalog that represents accurate product and price information that can be tailored based on the organization's affiliation of the requisitioner 310. Product and price information reflects the contract with a buyer. The supplier's catalog should be integrated effectively with inventory and order management system and an OBI server for sending OBI order requests and receiving OBI orders.

Figure 4:
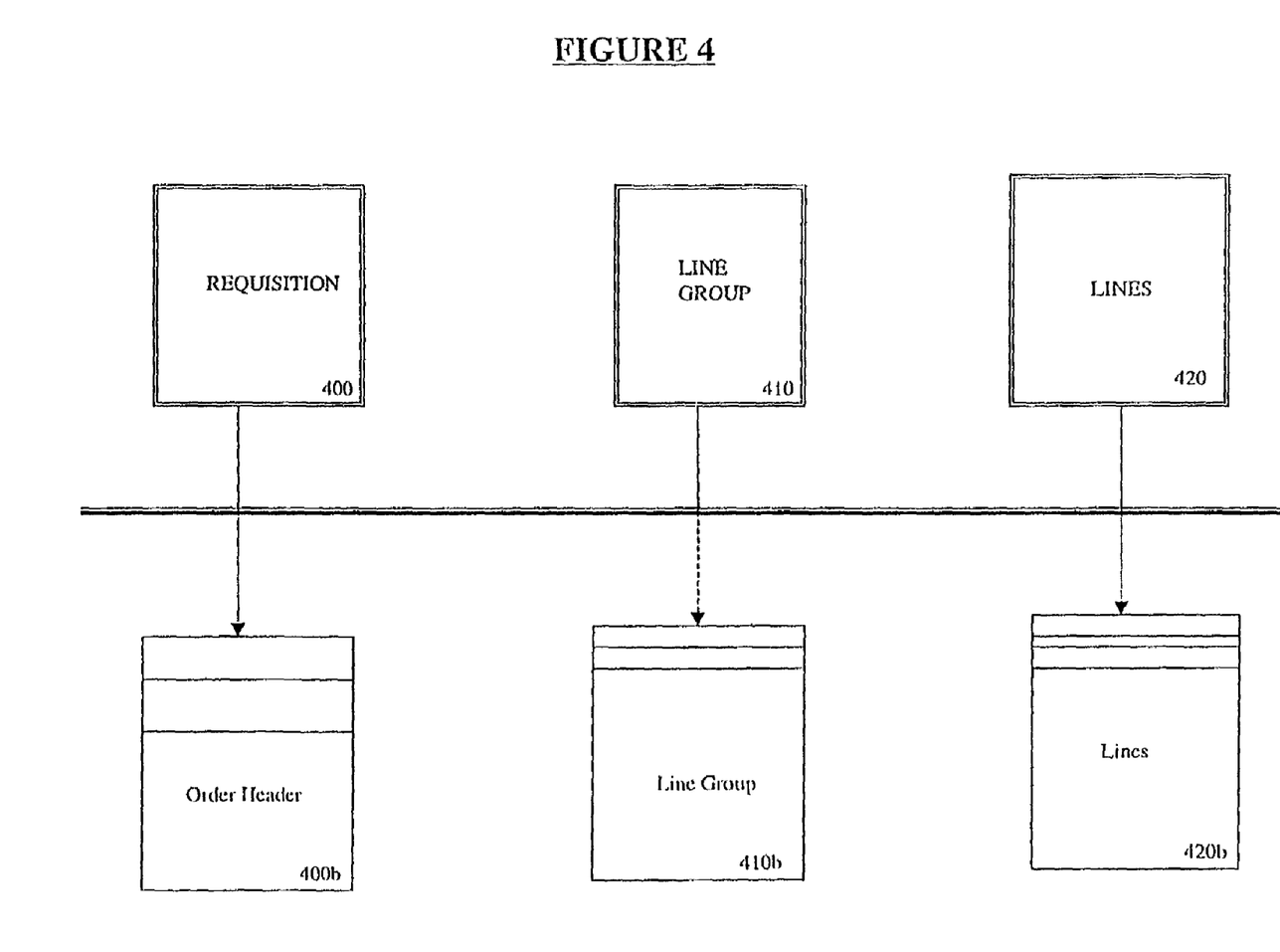
FIG. 4 is a block diagram of an exemplary data layout in memory and in a database of files in an embodiment of the present invention.

FIG. 4 is a block diagram illustration of an exemplary data structure layout of files and data objects of one embodiment of the e-Procurement system 120 of the present invention. As shown in FIG. 4, the file structure of the e-Procurement system 120 comprise requisition 400, line groups 410 and lines 420 which represent files structure stored in Memory 160.

The e-Procurement file system structure further comprises requisition 400*b*, line group 410*b* and line 420*b* which represent data objects which are stored in Database 140 and map to files in the file structure stored in Memory 160. In the present invention, line objects describe line item entries, such as the description of an item being purchased, the quantity, the location of the buyer or the supplier, etc., in a purchase order that specifies the order by a buyer or response to an order from a supplier respectively. And each line object has attributes which define the classes and sub-classes for items in a catalog. For example, the purchase number, the expiration date of the order, the creation date of the order, the modification date of the order, etc.

Requisition 400 and the corresponding data objects requisition 400*b* represent an electronic list of items a buyer has. A requisition is a purchase request that has not yet been approved as a purchase order. In the present invention, Requisitions 400 and 400*b* include templates that can be used to create another requisition. The template can contain actual items that are repeatedly ordered or other types of information such as default billing, shipping and approval information.

Line group 410 and the corresponding data objects 410*b* represent groups of line items contained in a number of purchase requisitions which indicate the type of items that a buyer orders or a supplier has available for sale. Line groups from a number of requisitions and may include, for example, Invoice line numbers, Order codes, Order line item number, etc.

Lines 420 and the corresponding data objects lines 420*b* represent the line items contained in each purchase requisition. As shown in FIG. 4, each line in memory maps to a data object line in Database 140. Also, each line in either Memory 160 or Database 140 maps to a line in Line group 410 and 410*b* respectively. In the present invention, line groups and lines are data items which are stored in Database 140 as data objects and data attributes.

Although the data objects and attributes may differ, the document transformation logic of the present invention relates the data object and attributes in a manner that enable the XDOC 220 to retrieve data in a relational manner when exact information of a purchase requisition is not found in the Database 140. The function and method of the file layout in Database 140 and Memory 160 is described in co-pending U.S. patent application titled "Dynamic Criteria Based Line-Grouping mechanism and method for Purchase Order Generation", filed on Oct. 15, 2001, Ser. No.09/981,147, assigned to the assignee of the present invention and hereby incorporated by reference herein.

Figure 5:
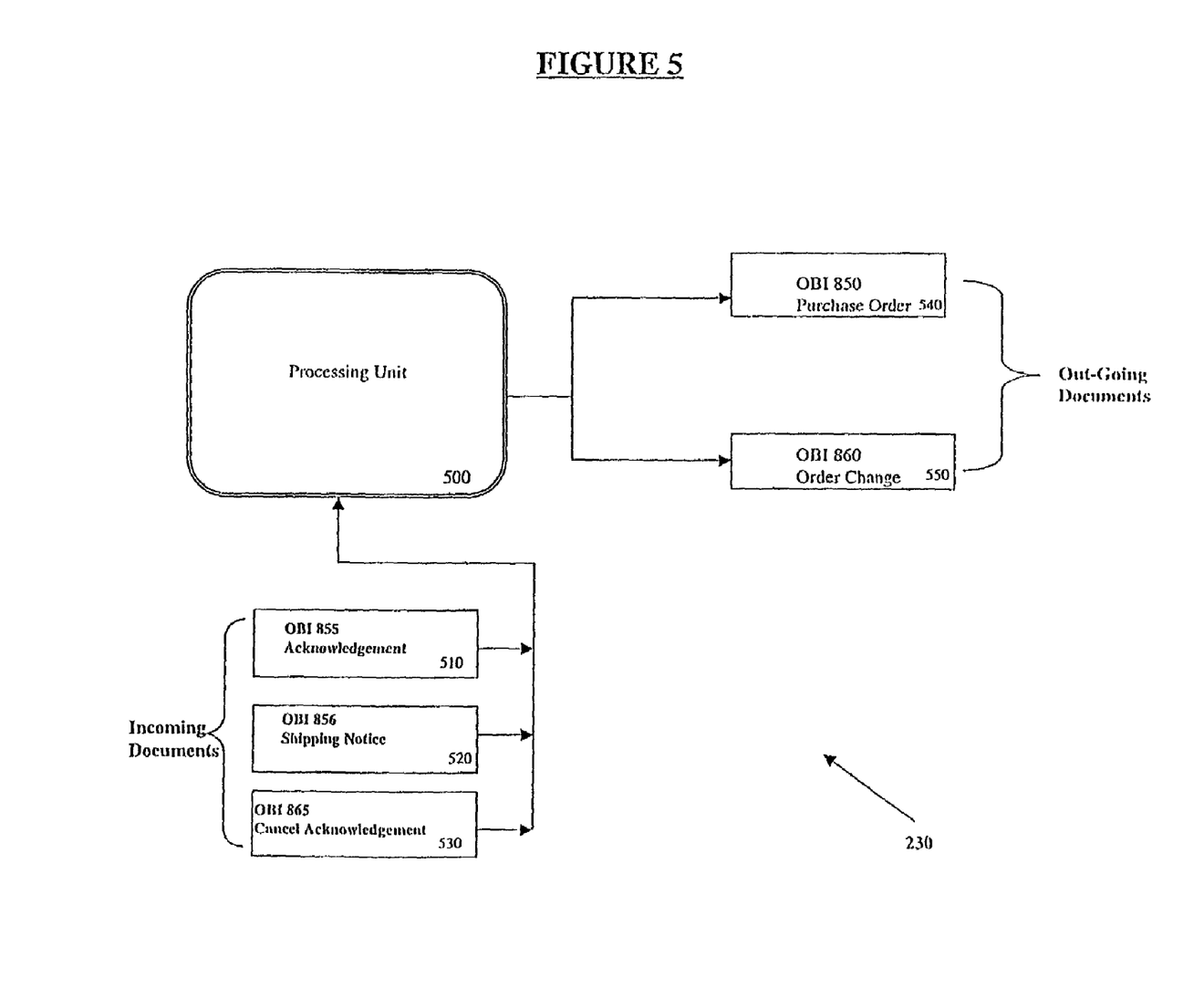
FIG. 5 is a block diagram of an exemplary in-bound and out-bound document generation of one embodiment of the purchasing and procurement system of the present invention.

FIG. 5 is block diagram depiction of one embodiment of the Mapping Module 230 of the present invention. As shown in FIG. 5, the Mapping Module 230 comprises Processing Unit 500, in-bound documents 510-530 and out-bound documents 540-560.

Processing Unit 500 comprises XML processing logic for automatically processing order requests and responses in XML or other applicable markup languages for purchase requisitions made via the e-Procurement system 120 of the present invention.

Process unit 500 generates XML documents for sending out order requests to suppliers by buyers or procurement professionals. Processing unit 500 also handles in-bound request documents (e.g., 510-530) emanating from suppliers responding to order requests from buyers using the e-Procurement system 120 of the present invention. The Processing Unit 500 uses a "documents exchange logic" to automate the processing of in-bound request documents and out-bound response documents by relating file information contained in the in-bound and out-bound documents to data objects and attributes retrieved from Database 140 based on a prior knowledge of the user's characteristics.

Still referring to FIG. 5, the in-bound documents comprise documents 510-530 which typically represent an OBI 855 document for handling order acknowledgements from a supplier and also represent OBI 856 documents which typically handle advance shipping instructions from the supplier to the buyer indicating when goods ordered by the buyer may be delivered. The in-bound documents further include OBI 865 documents which typically represent order cancellation acknowledgements from the supplier to the buyer acknowledging receipt of an order cancellation by the buyer.

Out-bound documents comprise documents 540 which typically represent OBI XML documents which may include an XML translation of the entire in-bound document set present to the Processing unit 500. Document 540 is included in out-bound documents to typically represent OBI 850 documents which represent Purchase Order generation to the supplier. Purchase Orders represent requisitions that have been approved by the buyer for supply by the supplier.

Document 550 represents OBI 860 documents set which typically include order changes that are submitted by the buyer to the supplier after a purchase order has been provided to the Supplier.

Figure 6:
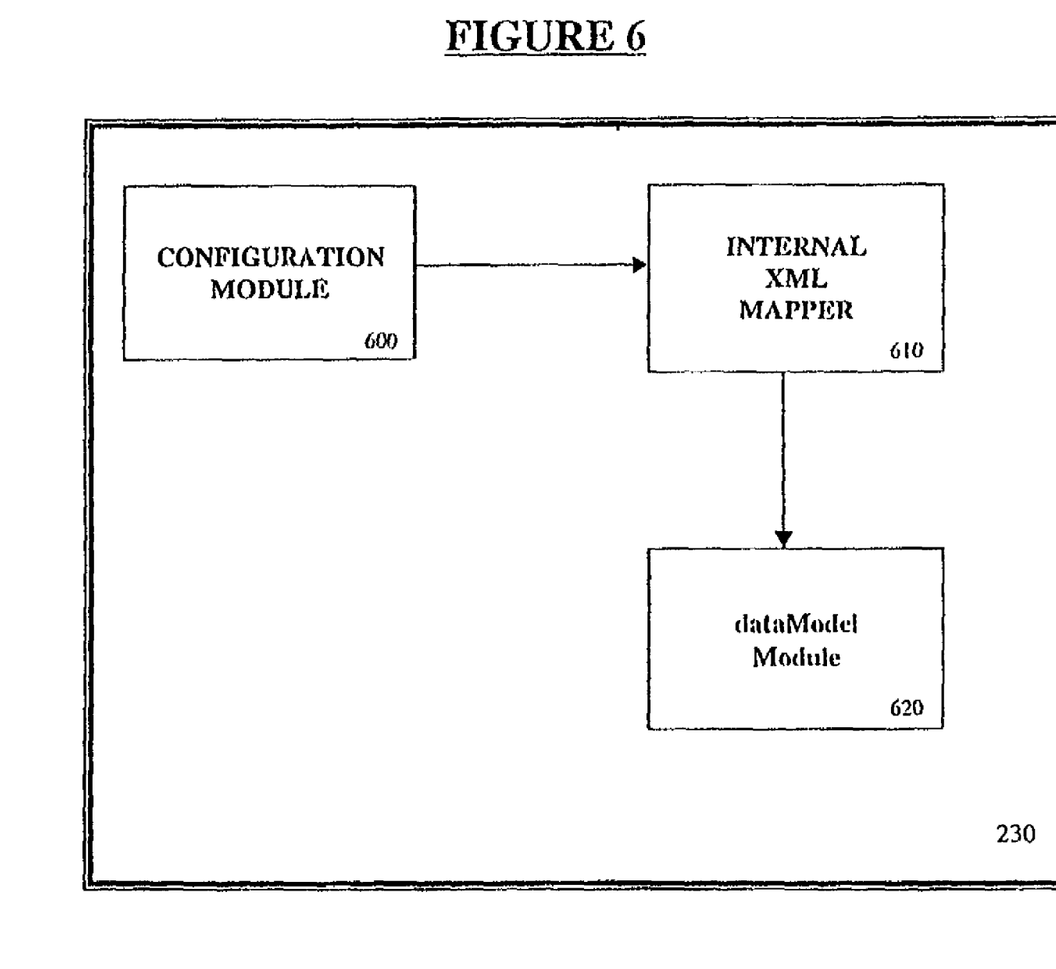
FIG. 6 is a block diagram of an embodiment of the functional units of the XML Mapping unit of one embodiment of the present invention.

FIG. 6 is a block diagram depiction of one embodiment of the internal architecture of the Mapping Module 230 of the present invention. As shown in FIG. 6, Mapping module 230 comprises Configuration Module 600, Internal XML Mapper 610 and dataModel module 620. The Mapping Module 230 performs a two step XML file translation process which enables the e-Procurement system 120 to handle XML files from a variety of external sources without having to modify the underlying code of these files in accordance with an embodiment of the present invention.

Configuration Module 600 is coupled to receive incoming OBI-XML and non-OBI-XML files from purchase requisition documents presented to the e-Procurement system 120. The Configuration Module 600 provides a mechanism for the e-Procurement system 120 to define the relationship between objects, attributes and tables of records of catalog items supported by the e-Procurement system 120 in the e-procurement environment. The Configuration Module 600 is configurable and customizable by the user to include XML tags of catalog objects and attributes that may be translated from incoming documents to the internal XML file. These tags may include, for example, <bill-to-address> which relates to a typical XML tag <Billing Location>, <send-to-address> which relates to a typical XML tag <receiving location>, etc. The data received by the Configuration module 600 is presented to the Internal XML mapper 610.

The Internal XML Mapper 610 of FIG. 6 is coupled to the Configuration Module 600 to receive the external XML tags (e.g., OBI-XML) and translate these tags into an internal XML objects known as Buyer-XML or bx_XML. The Internal XML Mapper 610 includes logic that enables the Mapping Module 230 retrieve XML objects stored in Memory 160 and write out OBI compliant XML files depending on the objects and attributes stored in Database 140 and specified by the user.

Files translation in the Internal XML Mapper 610 is achieved by the use of dataModel Module 620 which is utilized by XDOC 220 to traverse Database 140 to retrieve data objects corresponding to the inbound external XML files presented to Mapping Module 230. DataModel Module 620 includes flags that may be set by XDOC 220 in order to selectively retrieve object and attributes from Memory 160 and Database 140. DataModel Module 620 is configurable by the user to set flags that allows the e-Procurement system 120 to compile the underlying XDOC 220 code.

In an embodiment of the present invention, when XDOC 220 is configured for no-OBI compliant files, then there are some custom properties in the dataModel Module 620 that determines which attributes of a purchase order are to be written out for delivery to a supplier. The following illustrates an exemplary embodiment of such custom attribute:

```
"order_header" NTV {
"Class_name" Str "order_header",
"attribute" NTV {
"order_id" NTV {
"attr_name" Str "order_id"
"schema" NTVArr {
{
"schema" Str "order_header",
"schema_attr" Str "order_id"
}
. . . . . .
```

The above example shows that the order_id of a requisition should not be written out while writing an outbound purchase order. However, other attributes in the purchase order may be written out.

The above example also shows how attributes of a given object can be selectively written out during the implementation of XDOC 220. Thus, in the present invention, the Mapper Module 230 is configurable to specify the Purchase order/custom property for relationships between different objects. This allows the user the ability to specify if a line group, for example, is written out then line objects associated with the line group are also written out.

Of course, while writing out the line objects, the purchase order custom property for each attribute of the line group is examined. And only those attributes which have the purchase order variable set to true are written out.

Figure 7:
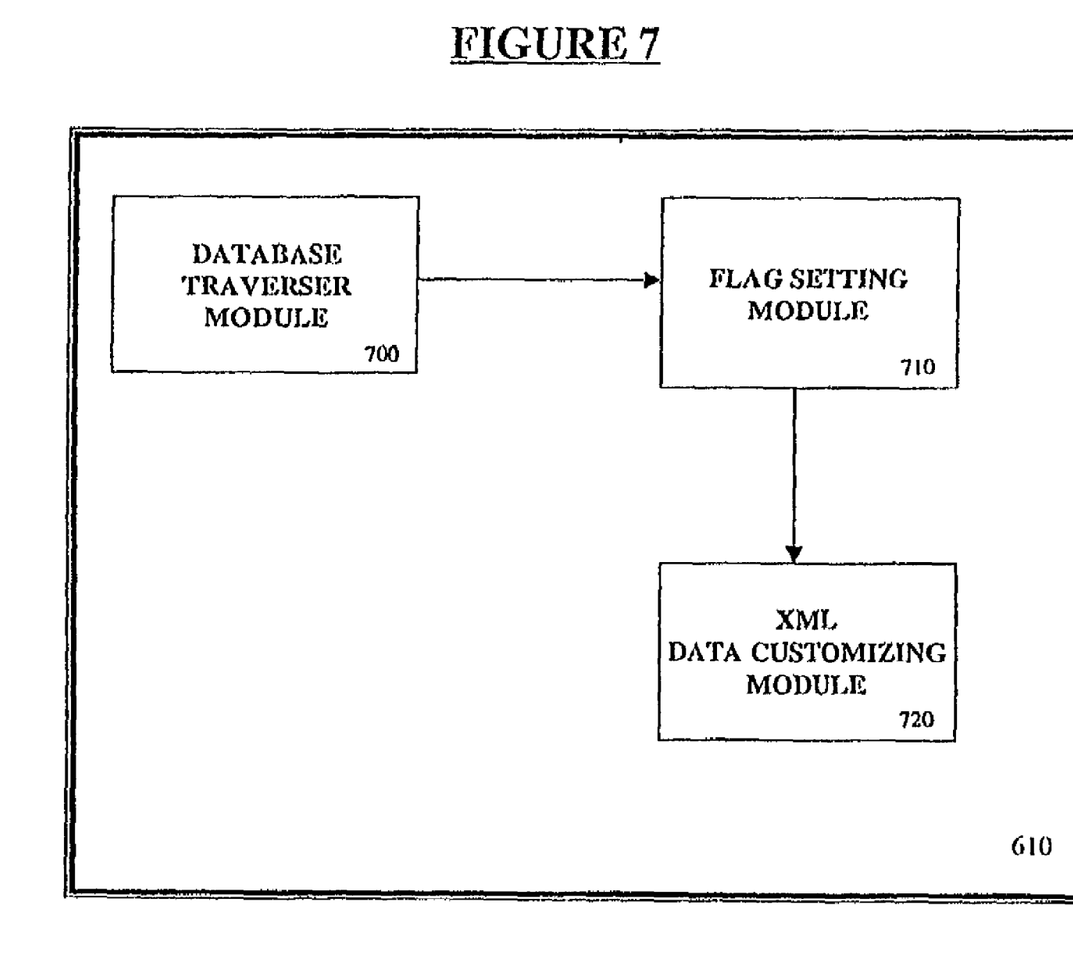
FIG. 7 is a block diagram of an embodiment of the Extensible Markup Language (XML) data Mapper and Transformation unit of one embodiment of the present invention.

FIG. 7 is a block diagram depiction of one embodiment of the Internal XML mapper 610 of the present invention. As shown in FIG. 7, the Internal XML mapper 610 comprises Database traverse module (DTM) 700, Flag setting module 710 and XML data customizing module 720.

Database traverse module 700 is coupled to provide traversing capabilities to the Internal XML mapper 610. DTM 700 recursively traverses Database 140 using the internal tags generated by the Two Step Mapper 230 in response to the OBI XML data presented in a purchase order, to retrieve data objects or related data objects from Database 140. DTM 700 further retrieves data attributes that correspond to the data objects identified by the tags. In the present invention, the Two Step Mapper 230 utilizes data relationships to directly map data objects which directly correspond to the OBI XML data presented in a purchase order or may use a relationship logic to map the OBI XML data to data objects which may relate to items in the purchase order.

Flag setting module 710 couples to DTM 700 to provide data write out selectivity to the Two Step Mapper 230. The mapping logic of the Two Step Mapper 230 can set Flag setting module 710 to indicate those contents of the data objects and attributes retrieved from Database 140 that can be written out in response to an in-bound document. Flag setting module 710 is either set to a "yes" or a "no" to indicate when data should be written out in an out-bound document.

XML data customizing module 720 provides the DTM 700 with the capability to selectively retrieve data objects from the Database 140 based on the contents of Flag setting module 710 and the attributes associated with a particular data object.

Figures 8A, 8B:
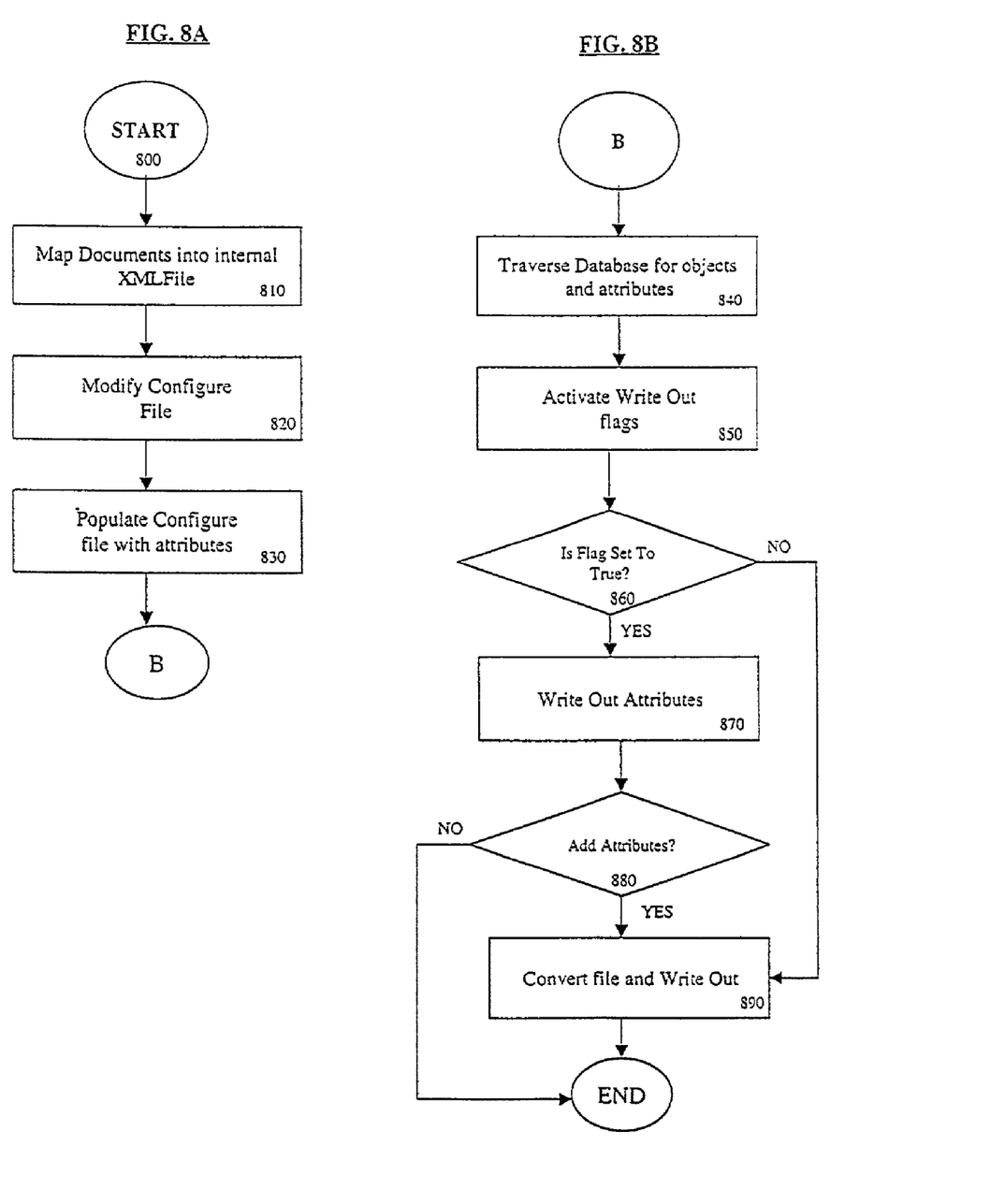
FIG. 8A and FIG. 8B are a flow diagram of one embodiment of the two step XML data fetching and transformation process in accordance with one embodiment of the present invention.

FIGS. 8A and 8B depict a flow diagram illustration of one embodiment of the mapping of in-bound and out-bound documents, respectively, in accordance with one embodiment of the present invention. The process illustrated in FIG. 8A and FIG. 8B is implemented as computer instruction code stored in memory and executed by a computer system processor. As shown in FIG. 8A, an in-bound document processing starts at step 800 when the contents of the in-bound documents are received by the Mapper Module 230. At step 810, the files in the in-bound document is mapped to the internal XML files of the Mapper Module 230.

At step 820, the Configuration file 600 is modified to include data objects and attributes in the in-bound document that are not present in Database 140. The new attributes of the data objects from the resulting Configuration file modification are used to then populate the Configuration Module 600 at step 830.

To generate out-bound documents responsive to the in-bound documents, the mapping logic in Mapper Module 230 traverses the Database 140 using dataModel Module 620 at step 840. In the present invention, Database 140 can be traversed at either the data object level or the attribute level.

At step 850, processing flags are activated to enable the disabling of data objects or attribute write outs by the mapping logic. At decision step 860, the mapping logic checks the data write out flag to determine whether the flag is set to true. If the write-out flag is set to true, the attribute/object of the contents of the out-bound documents is written out at step 870. On the other hand, if the data write out flag is set to false, the data write-out step 870 is skipped.

At step decision step 880, the mapping logic checks to determine if new attributes have to be added to the Configuration file Module 600. If new attributes are to be added, the Configuration file Module 600 is modified and the in-bound file is converted from the internal XML file (e.g., bx_XML) into a markup file suitable for delivery with the out-bound documents at step 890. However, if no new attributes have to be added, processing of the out-bound documents ends.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer system, comprising:
a processor; and
a memory storing computer instruction code executable by the processor to implement an electronic purchasing system configured to implement:
  mapping electronic purchase requisition content in a first data format processed internally to a second data format utilizing tags of said first data format to determine corresponding data objects;
  accessing a database configured to store data descriptors describing electronic purchase requisition content, said database further configured to store data objects and attributes pertinent to said electronic purchase requisition content, wherein said tags of said first data format correspond to data objects and attributes in said database;

wherein said mapping comprises mapping the tags of said first data format to tags of said second data format to determine data objects and attributes in said database corresponding to content in said second format; and in response to receiving a particular purchase request associated with a particular purchasing requisitioner, presenting translated content in a third format for delivery to said purchasing requisitioner, wherein said presenting comprises selectively retrieving one or more of said corresponding data objects and attributes according to one or more flags, wherein each said flag indicates whether or not a corresponding data object or attribute is to be presented in said translated content.

2. The computer system of claim 1, wherein the electronic purchasing system is further configured to implement: providing specific markup language templates which, in combination with said electronic purchase requisition content, are translated into content for presentation to a particular purchasing requisitioner.

3. The computer system of claim 2, wherein said electronic purchasing system is extensible to include pre-defined data descriptors for the contents of said electronic purchasing requisition content.

4. The computer system of claim 1, wherein said electronic purchasing system is further configured to implement: formatting the contents of said electronic purchase requisition content from said first format into said second format.

5. The computer system of claim 4, wherein said electronic purchasing system is further configured to implement: using pre-defined tag information responsive to said second data format to retrieve associated data information describing the contents of said electronic purchase requisition content.

6. The computer system of claim 1, wherein said first data format of said electronic purchase requisition content is compliant with Extensible Markup Language (XML) content.

7. The computer system of claim 5, wherein said electronic purchasing system is further configured to implement: mapping index information of said first data format into said tag information of said second data format.

8. The computer system of claim, wherein said presenting is performed according to a user-customizable configuration text file.

9. The computer system of claim 6, wherein said XML content is compliant with the Open Buying on the Internet Standard.

10. The computer system of claim 7, wherein said particular purchasing requisitioner is a wireless personal computer system.

11. A computer system, comprising:
a processor; and
a memory storing computer instruction code executable by the processor to implement an electronic purchasing system configured to implement:
interfacing to a plurality of good and services catalogs residing in a database, each of said catalogs comprising unique goods and services identification parameters;
retrieving in-bound XML data of a first type from a source external to said server in response to a purchase requisition request from a particular purchase order and generating an intermediary XML data of a second type and presenting out-bound XML data of a third type for delivery in response to said purchasing requisition request;
traversing said database to extract data objects and attributes corresponding to said particular purchase order according to a mapping of tag information of said in-bound XML data to said intermediary XML data; and
processing said purchase requisition request in said electronic purchasing system according to a flag for the out-bound XML data, wherein said flag indicates whether or not a corresponding data object or attribute is to be presented in said out-bound XML data.

12. The computer system of claim 11, wherein the electronic purchasing system is further configured to implement: retrieving one or more XML content formatting templates specific to purchase order line item data object and attribute information defining said goods and services in said purchase order.

13. The computer system of claim 12, wherein the electronic purchasing system is further configured to implement: translating tag information associated with said XML data said first type into corresponding tag information of XML data of said second type for processing by said electronic purchasing system.

14. The computer system of claim 13, wherein the electronic purchasing system is further configured to implement: accessing a data configuration file for providing configuration information corresponding to the content of said XML data of said first type for said translating.

15. The computer system of claim 14, wherein said data configuration file is extensible to alter translation data used for said translating.

16. A computer system, comprising:
a processor; and
a memory storing computer instruction code executable by the processor to implement an electronic purchasing system configured to implement:
retrieving in-bound XML data of a first type from an external source in response to a particular purchase requisition content access request from a particular purchase order, generating an intermediary XML data of a second type by mapping tags of said in-bound XML data to determine data objects corresponding to said intermediary XML data, and presenting out-bound XML data of a third type for delivery in response to said purchase requisition content access request; and
processing said purchase requisition content access request in said electronic purchasing system by selectively retrieving one or more of said corresponding data objects and attribute according to a flag, wherein said flag indicates whether or not a corresponding data object or attribute is to be presented in said out-bound XML data.

17. The computer system of claim 16, wherein the electronic purchasing system is further configured to implement: retrieving one or more XML content formatting templates specific to purchase order line item data object and attribute information defining said goods and services in said purchase order.

18. The computer system of claim 17, wherein the electronic purchasing system is further configured to implement: translating tag information associated with said XML data of said first type into corresponding tag information of XML data of said second type for processing by said electronic purchasing system.

19. The computer system of claim 17, wherein the electronic purchasing system is further configured to implement: accessing a data configuration file for providing configuration information corresponding to the content of said XML data of said first type.

20. The computer system of claim 19, wherein said electronic purchasing system is extensible to dynamically alter translation data provided to said electronic purchasing system.

21. The computer system of claim 19, wherein said XML data is compliant with Wireless Markup Language content.

22. A method of mapping Extensible Markup Language (XML) in an electronic purchasing system, said method comprising:

receiving a purchase request having a first XML data format;

retrieving XML content in a second XML data format in response to said first XML data format in said purchase request from one or more data sources internal to said purchasing system, wherein said retrieving comprises mapping tags of said first XML data format to tags of said second XML data format to determine corresponding data objects; and transforming said retrieved XML content into appropriate content for an underlying markup language of an Internet browser used by a user submitting said purchase request by selectively presenting said retrieved XML content according to a flag, wherein said flag indicates whether or not a corresponding data object or attribute is to be presented.

23. The method of claim 22, further comprising providing configuration files for retrieving template information specific to said first XML data format for transforming said XML content.

24. The method of claim 23, further comprising providing identification tags which correspond to data objects that is used in said transforming of said retrieved XML content.

* * * * *